United States Patent
Shibata et al.

(10) Patent No.: US 11,589,130 B2
(45) Date of Patent: Feb. 21, 2023

(54) SYSTEM, METHOD, AND PROGRAM FOR DISTRIBUTING LIVE VIDEO

(71) Applicant: DeNA Co., Ltd., Tokyo (JP)

(72) Inventors: Kazuto Shibata, Tokyo (JP); Erí Matsuda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 273 days.

(21) Appl. No.: 16/986,560

(22) Filed: Aug. 6, 2020

(65) Prior Publication Data
US 2021/0058678 A1   Feb. 25, 2021

(30) Foreign Application Priority Data

Aug. 6, 2019  (JP) .............................. JP2019-144311

(51) Int. Cl.
*H04N 21/485*   (2011.01)
*H04N 21/44*   (2011.01)

(52) U.S. Cl.
CPC .......... *H04N 21/485* (2013.01); *H04N 21/44* (2013.01)

(58) Field of Classification Search
CPC .. H04N 21/485; H04N 21/44; H04N 21/4316; H04N 21/4758; H04N 21/4788; H04N 21/2187
See application file for complete search history.

(56) References Cited

U.S. PATENT DOCUMENTS

| | | | | |
|---|---|---|---|---|
| 8,335,833 B1 * | 12/2012 | Parkinson | .......... | H04N 21/4882 715/752 |
| 8,726,312 B1 * | 5/2014 | Hewinson | .......... | H04N 21/2668 725/35 |
| 11,206,235 B1 * | 12/2021 | Sarkar | ................ | H04L 12/1831 |

(Continued)

FOREIGN PATENT DOCUMENTS

| JP | H11-110181 A | 4/1999 |
|---|---|---|
| JP | 2003-296549 A | 10/2003 |

(Continued)

OTHER PUBLICATIONS

Office Action for related JP Patent Application No. 2019-144311, dated Feb. 25, 2020, 20 pages.

(Continued)

*Primary Examiner* — Michael B. Pierorazio
(74) *Attorney, Agent, or Firm* — Procopio, Cory, Hargreaves & Savitch LLP

(57) ABSTRACT

A video distribution system according to an embodiment of the present invention comprises a video distribution server and a user terminal, in which the server provides a live video distribution service for distributing and viewing live video to a user via the user terminal. The system is configured such that the distribution screen presented to the distributor of the live video has a comment display area for displaying at least part of the comment group including comments from viewers, and the display mode is based on at least the number of hidden subsequent comments whose order of posting is later (Continued)

than that of the displayed portion of the comment group displayed in that area. Therefore, when the distributor responds to a displayed comment, the distributor can obtain information based on the number of hidden subsequent comments whose order of posting is later than that of this comment.

12 Claims, 16 Drawing Sheets

(56) References Cited

U.S. PATENT DOCUMENTS

| | | | | |
|---|---|---|---|---|
| 2008/0235592 | A1* | 9/2008 | Trauth | G06F 3/0485 |
| | | | | 715/764 |
| 2009/0164484 | A1* | 6/2009 | Horowitz | H04N 21/4532 |
| 2012/0042334 | A1* | 2/2012 | Choi | H04N 21/6582 |
| | | | | 725/110 |
| 2013/0219301 | A1* | 8/2013 | Cheng | G06Q 10/06 |
| | | | | 715/753 |
| 2019/0087151 | A1* | 3/2019 | Systrom | H04N 21/233 |
| 2019/0349648 | A1* | 11/2019 | Watanabe | G06T 7/20 |
| 2019/0394146 | A1* | 12/2019 | Wang | H04N 21/4882 |

FOREIGN PATENT DOCUMENTS

| | | |
|---|---|---|
| JP | 2005-157756 A | 6/2005 |
| JP | 2008-97104 A | 4/2008 |
| JP | 2012-34351 A | 2/2012 |
| JP | 2012-118919 A | 6/2012 |
| JP | 2012-195000 A | 10/2012 |
| JP | 2013-65306 A | 4/2013 |
| JP | 2013-150221 A | 8/2013 |
| JP | 2014-127169 A | 7/2014 |
| JP | 2014-199524 A | 10/2014 |
| JP | 2015-210646 A | 11/2015 |
| JP | 2016-143203 A | 8/2016 |
| JP | 2016-197879 A | 11/2016 |
| JP | 2017-156863 A | 9/2017 |
| JP | 2018-180681 A | 11/2018 |
| JP | 2018-195127 A | 12/2018 |
| JP | 2019-54510 A | 4/2019 |
| WO | 2016/039156 A1 | 3/2016 |

OTHER PUBLICATIONS

Shima, et al., Nico Nico Live Broadcast Pocket Guide, Mainichi Communications, Nov. 15, 2010, pp. 25,53-64.

* cited by examiner

User information table 411

| User account |
| --- |
| Basic information |
| Distribution history information |
| Viewing history information |
| Followed user information |
| Follower information |
| Family information |
| Ranking |
| Ranking meter value |
| Number of coins possessed |
| Number of diamonds possessed |
| ... |

FIG. 3

| Ranking group | S | | | A | | | B | | | C | | | D | | | E |
| --- | --- | --- | --- | --- | --- | --- | --- | --- | --- | --- | --- | --- | --- | --- | --- | --- |
| Ranking | S+ | S | S− | A+ | A | A− | B+ | B | B− | C+ | C | C− | D+ | D | D− | E |

FIG. 4

Distribution management table 412

| Distribution ID |
| --- |
| Distributor user account |
| Distribution date and time |
| Distribution duration |
| Number of viewers (current value and maximum value) |
| Number of comments |
| Number of likes |
| Item points |
| Distribution points |
| ... |

FIG. 5

| Rank of distribution points within ranking group on previous day | Change in ranking meter value |
|---|---|
| Top 10% | + 2 |
| Top 11 to 30% (remaining 20% after subtracting top 10% from top 30%) | + 1 |
| Middle 30% | ± 0 |
| Bottom 40% | − 1 |
| * No distribution that day | − 1 |

| Ranking update content | Required ranking meter value |
|---|---|
| Promotion from one ranking group to another | + 4 |
| Promotion within same ranking group | + 2 |
| Demotion from one ranking group to another | − 2 |
| Demotion within same ranking group | − 6 |

SYSTEM, METHOD, AND PROGRAM FOR DISTRIBUTING LIVE VIDEO

This application claims foreign priority under 35 USC 119 based on Japanese Patent Application No. Patent Application: 2019-144311, filed on Aug. 6, 2019, the contents of which is incorporated herein in its entirety by reference.

BACKGROUND

1. Field

The present invention relates to a system, a method, and a program (e.g., non-transitory computer-readable medium including instructions to be performed on a processor) for distributing live video.

2. Related Art

There is a related art service for distributing live video provided by a distributor to a plurality of viewers (see, for example, Patent Document 1 below). A live video distribution service such as this is typically configured to allow viewers (listeners) to input (post) comments. A viewer can enjoy the distributor's response to a comment posted by the viewer himself (for example, reading the comment during the distribution of the live video and answering a question, saying thank you, etc.), and this enjoyment may motivate viewers to keep using the live video distribution service.

PRIOR ART LITERATURE

Patent Documents

[Patent Document 1]
Patent Document 1: JP-A 2019-022219

SUMMARY

Problems to be Solved by the Invention

However, in a related art live video distribution service, since many viewers will come together for distribution by a popular distributor, for example, the number of comments posted will also be large and, as a result, the response to the comments by the distributor may be insufficient. For instance, if the response to comments is slower than the rate at which comments are posted, this can result in what is known as "comment congestion." If the distributor does not respond sufficiently to comments posted by viewers, the viewers will not be as satisfied with the service.

One object of an embodiment of the present invention is to assist the response by a distributor to comments from viewers. Other objects of embodiments of the present invention will become apparent by reference to the specification as a whole.

Means for Solving the Problems

The system according to an embodiment of the present invention is a system for distributing live video, comprising one or more computer processors, wherein the one or more computer processors respond to the execution of a readable command to execute processing to present a distribution screen to the distributor of the live video; processing to present a viewing screen to the viewer of the live video; and processing to display comments inputted by viewers of a specific live video on the distribution screen of the distributor of the specific live video and on the viewing screens of a plurality of viewers of the specific live video, and the distribution screen is configured to have a comment display area in which is displayed at least part of a comment group in which a plurality of comments including at least comments inputted by viewers are arranged in the order of posting, and such that, of the plurality of comments included in the comment group, the display mode is based on at least the number of hidden subsequent comments whose order of posting is later than that of the display portion of the comment group displayed in the comment display area.

The method according to an embodiment of the present invention is a method for distributing live video, which is executed by one or more computers, said method comprising presenting a distribution screen to the distributor of the live video; presenting a viewing screen to the viewer of the live video; and displaying comments inputted by viewers of a specific live video on the distribution screen of the distributor of the specific live video and on the viewing screens of a plurality of viewers of the specific live video, wherein the distribution screen is configured to have a comment display area in which is displayed at least part of a comment group in which a plurality of comments including at least comments inputted by viewers are arranged in the order of posting, and such that, of the plurality of comments included in the comment group, the display mode is based on at least the number of hidden subsequent comments whose order of posting is later than that of the display portion of the comment group displayed in the comment display area.

The first program (e.g., non-transitory computer-readable medium including instructions to be performed on a processor) according to an embodiment of the present invention is a program for distributing live video, which, when executed on one or more computers, causes said one or more computers to execute processing to present a distribution screen to the distributor of the live video; processing to present a viewing screen to the viewer of the live video; and processing to display comments inputted by viewers of a specific live video on the distribution screen of the distributor of the specific live video and on the viewing screens of a plurality of viewers of the specific live video, wherein the distribution screen is configured to have a comment display area in which is displayed at least part of a comment group in which a plurality of comments including at least comments inputted by viewers are arranged in the order of posting, and such that, of the plurality of comments included in the comment group, the display mode is based on at least the number of hidden subsequent comments whose order of posting is later than that of the display portion of the comment group displayed in the comment display area.

The second program (e.g., non-transitory computer-readable medium including instructions to be performed on a processor) according to an embodiment of the present invention is a program for distributing live video, which, when executed on a user terminal, causes said user terminal to execute processing to display a distribution screen for distributing live video, wherein the distribution screen is configured to have a comment display area in which is displayed at least part of a comment group in which a plurality of comments including at least comments inputted by viewers are arranged in the order of posting, and such that, of the plurality of comments included in the comment group, the display mode is based on at least the number of hidden subsequent comments whose order of posting is later than that of the display portion of the comment group displayed in the comment display area.

Effect of the Invention

Various embodiments of the present invention assist a distributor's response to comments from viewers.

BRIEF DESCRIPTION OF THE DRAWINGS

FIG. 3 An example of the information that is managed in a user information table 411.

FIG. 4 A table illustrating rankings.

FIG. 5 An example of the information that is managed in a distribution management table 412.

DETAILED DESCRIPTION

Embodiments of the present invention will now be described with reference to the drawings.

Figure 1:
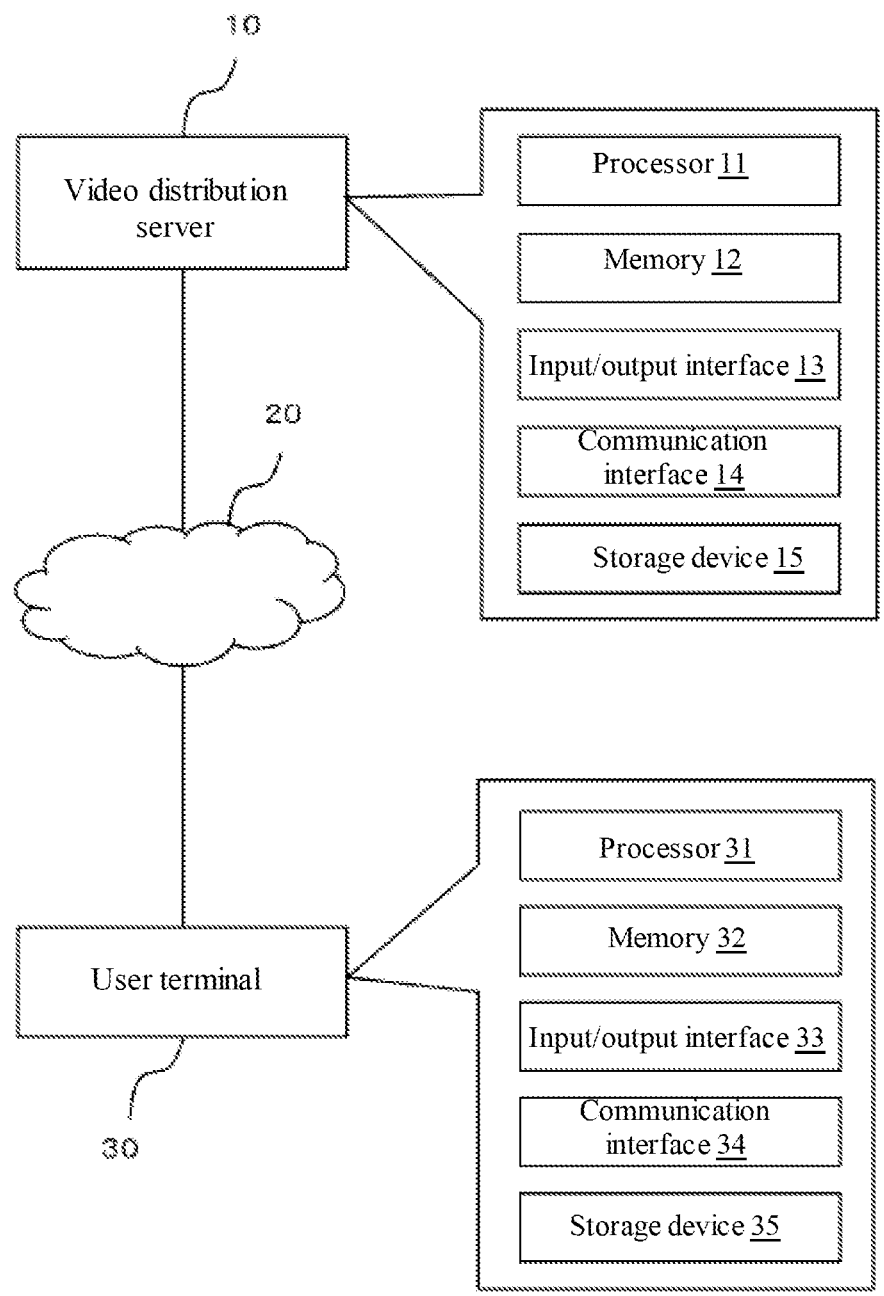
FIG. 1 A configuration diagram schematically showing the network configuration of a video distribution system 1 according to an embodiment of the present invention.

FIG. 1 is a configuration diagram schematically showing the network configuration of the video distribution system 1 according to an embodiment of the present invention. As shown in the drawing, the system 1 comprises a video distribution server 10 and a user terminal 30 that is communicably connected to the video distribution server 10 via a communication network 20 such as the Internet. Only one user terminal 30 is shown in FIG. 1, but the video distribution system 1 comprises a plurality of user terminals 30. The video distribution server 10 presents to the user a live video distribution service for distributing and viewing live video via the user terminal 30. In this embodiment, the user who operates the user terminal 30 can distribute a live video as a distributor, and can also view a live video provided by another user as a viewer.

The video distribution server 10 is configured as an ordinary computer and, as shown in FIG. 1, comprises a computer processor 11, a main memory 12, an input/output interface 13, a communication interface 14, and a storage device 15. These constituent elements are electrically connected via a bus or the like (not shown).

The computer processor 11 is configured as a CPU, a GPU, or the like, reads various programs (e.g., non-transitory computer-readable medium including instructions to be performed on a processor) stored in the storage device 15 or the like into the main memory 12, and executes the various commands included in these programs. The main memory 12 is constituted by a DRAM or the like, for example.

The input/output interface 13 includes various kinds of input/output device for exchanging information among users or the like. The input/output interface 13 includes, for example, an information input device such as a keyboard or a pointing device (such as a mouse or a touch panel), a voice input device such as a microphone, and an image input device such as a camera. The input/output interface 13 also includes an image output device such as a display, and an audio output device such as a speaker.

The communication interface 14 is in the form of hardware such as a network adapter, any of various kinds of communication software, or a combination of these, and is configured to accomplish wired or wireless communication via the communication network 20 or the like.

The storage device 15 is constituted by a magnetic disk, a flash memory, or the like, for example. The storage device 15 stores various programs (e.g., non-transitory computer-readable medium including instructions to be performed on a processor) including an operating system, various kinds of data, and so forth.

In this embodiment, the video distribution server 10 may be configured using a plurality of computers each having the above-mentioned hardware configuration. For instance, the video distribution server 10 may be constituted by one or more server devices.

The video distribution server 10 with the above configuration may be configured to function as a web server and an application server, in which case various kinds of processing are executed in response to requests from the web browser and other applications installed in the user terminal 30, and screen data (such as HTML data), control data, and the like according to the result of the processing are transmitted to the user terminal 30. A web page or other screen based on the received data may be displayed at the user terminal 30.

The user terminal 30 is configured as an ordinary computer and, as shown in FIG. 1, comprises a computer processor 31, a main memory 32, an input/output interface 33, a communication interface 34, and a storage device 35. These constituent elements are electrically connected via a bus or the like (not shown).

The computer processor 31 is configured as a CPU, a GPU, or the like, reads various programs stored in the storage device 35 or the like into the main memory 32, and executes the various commands included in these programs. The main memory 32 is constituted by a DRAM or the like, for example.

The input/output interface 33 includes various kinds of input/output device for exchanging information among users or the like. The input/output interface 33 includes, for example, an information input device such as a keyboard or a pointing device (such as a mouse or a touch panel), a voice input device such as a microphone, and an image input device such as a camera. The input/output interface 33 also includes an image output device such as a display and an audio output device such as a speaker.

The communication interface 34 is in the form of hardware such as a network adapter, any of various kinds of communication software, or a combination of these, and is configured to accomplish wired or wireless communication via the communication network 20 or the like.

The storage device 35 is constituted by a magnetic disk, a flash memory, or the like, for example. The storage device 35 stores various programs (e.g., non-transitory computer-readable medium including instructions to be performed on a processor) including an operating system, various kinds of data, and so forth. The programs stored in the storage device 35 can be downloaded from an application market or the like and installed.

In this embodiment, the user terminal 30 may be configured as a smartphone, a tablet terminal, a personal computer, a wearable device, or the like.

A user who operates the user terminal 30 configured as above can utilize the live video distribution service provided by video distribution server 10 by executing communication with the video distribution server 10 via a web browser or other application installed in the storage device 35 or the like.

Figure 2:
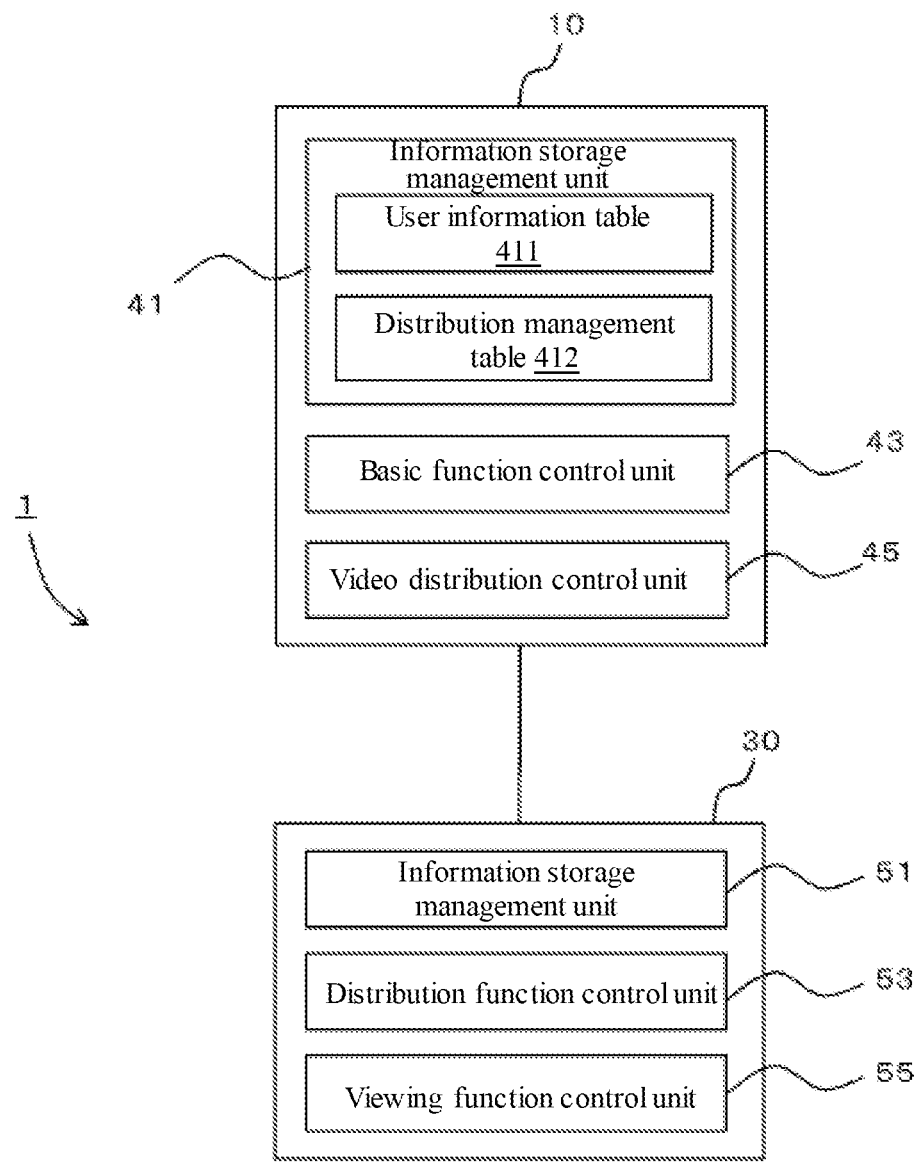
FIG. 2 A block diagram schematically showing the functions of the video distribution system 1.

Next, the functions of the video distribution system 1 of this embodiment will be described. FIG. 2 is a block diagram schematically showing the functions of the video distribution server 10 and the user terminal 30. As shown, the server 10 has an information storage management unit 41 that stores and manages various kinds of information, a basic function control unit 43 that controls the basic functions of the live video distribution service, and a video distribution control unit 45 that controls the distribution of the live video. These functions are realized when hardware such as the computer processor 11 and the main memory 12 operates in conjunction with the various programs (e.g., non-transitory computer-readable medium including instructions to be performed on a processor), data, and so forth stored in the storage device 15 and the like (for example, a server-side program for providing a live video distribution service). For instance, these functions are realized when the computer processor 11 executes the commands included in a program (e.g., non-transitory computer-readable medium including instructions to be performed on a processor) read into the main memory 12. Also, some or all of the functions of the server 10 shown in FIG. 2 may be realized by cooperation between the server 10 and the user terminal 30, or may be realized by the user terminal 30.

As shown in FIG. 2, the user terminal 30 has an information storage management unit 51 that stores and manages various kinds of information, a distribution function control unit 53 that controls the terminal-side distribution function in a live video distribution service, and a viewing function control unit 55 that controls the terminal-side viewing function in a live video distribution service. These functions are realized when hardware such as the computer processor 31 and the main memory 32 operates in conjunction with the various programs (e.g., non-transitory computer-readable medium including instructions to be performed on a processor), data, and so forth stored in the storage device 35 and the like (for example, a terminal-side program for using the live video distribution service, which is stored ahead of time as an application in the storage device 35, or is provided from the server 10 in a format that can be executed by this application, a web browser, or the like). For instance, these functions are realized when the computer processor 31 executes the commands included in a program (e.g., non-transitory computer-readable medium including instructions to be performed on a processor) read into the main memory 32. Also, some or all of the functions of the user terminal 30 shown in FIG. 2 may be realized by cooperation between the server 10 and the user terminal 30, or may be realized by the server 10.

The information storage management unit 41 of the video distribution server 10 stores and manages various kinds of information in the storage device 15 and the like. For example, as shown in FIG. 2, the information storage management unit 41 is configured to have a user information table 411 that manages information about users of the live video distribution service, and a distribution management table 412 that manages information about the distribution of individual live videos.

The basic function control unit 43 of the video distribution server 10 executes various processing related to control of the basic functions of the live video distribution service. For example, the basic function control unit 43 sends screen data or control data for various screens related to the basic functions to the user terminal 30, executes various processing in response to an operation inputted by the user via the screen displayed on the user terminal 30, and sends the screen data or control data according to the result of this processing to the user terminal 30. The basic functions controlled by the basic function control unit 43 include, for example, login processing (user authentication), accounting control, and user management (such as updating the user information table 411).

The video distribution control unit 45 of the video distribution server 10 executes various processing related to the control of live video distribution. For example, the video distribution control unit 45 is configured to deliver the live videos provided by each of a plurality of distributors to a plurality of viewers. For instance, the video distribution control unit 45 is configured to receive a live video transmitted from the user terminal 30 of a distributor (this will also be referred to as a "distributor terminal 30"), and to transmit this live video to the user terminals 30 of a plurality of viewers (these will also be referred to as a "viewer terminal 30"). The live video is comprised by, for example, video inputted via the camera and audio inputted via the microphone of the distributor terminal 30. This distribution of live video can be performed by a streaming method using a protocol such as HTTP Live Streaming (HLS).

The information storage management unit 51 of the user terminal 30 stores and manages various kinds of information in the storage device 35 and the like. The distribution function control unit 53 of the user terminal 30 executes various processing related to the control of the terminal-side distribution function of the live video distribution service. This distribution function is a function by which the user of the user terminal 30 can distribute live video as a distributor. For example, the distribution function control unit 53 is configured to generate, in real time, video data for a video comprised by video inputted via the camera and audio inputted via the microphone of the user terminal 30, and to send the video data thus generated to the server 10. Also, the distribution function control unit 53 is configured, for example, to display a distribution screen for distributing live video on the user terminal 30 based on at least the screen data or the control data received from the server 10.

The viewing function control unit 55 of the user terminal 30 executes various processing related to control of the terminal-side viewing function of the live video distribution service. This viewing function is a function by which the user of the user terminal 30 can view a video distributed by another user, as a viewer. For example, the viewing function control unit 55 is configured to receive the video data for a live video transmitted from the server 10 and to reproduce (display) the live video based on the received video data. Also, the viewing function control unit 55 is configured, for example, to display a viewing screen for viewing a live video on the user terminal 30, based on at least the screen data or the control data received from the server 10.

In this embodiment, the video distribution control unit 45 of the server 10 is configured to display comments inputted by viewers of a live video on the distribution screen of the distributor of the live video and on the viewing screens of the plurality of viewers of this live video. For example, the video distribution control unit 45 is configured such that when a comment inputted via the viewing screen by a viewer of a specific live video is received from the viewer terminal 30 of that viewer, data including that comment is transmitted to the distributor terminal 30 of the distributor of that particular live video and to the viewer terminals 30 of the plurality of viewers of that particular live video. At the distributor terminal 30 and the viewer terminals 30 that have received this data, the comment included in this data is displayed on the distribution screen and the viewing screen.

In this embodiment, the distribution screen displayed on the distributor terminal 30 is configured to have a comment display area in which is displayed at least part of a comment group in which a plurality of comments including at least comments inputted by viewers are arranged in the order of posting. Also, this distribution screen is configured such that, of the plurality of comments included in the comment group, the display mode is based on at least the number of hidden subsequent comments whose order of posting is later than that of the displayed portion of that comment group displayed in the comment display area.

Thus, with the video distribution system 1 in this embodiment, the distribution screen presented to the distributor of the live video is configured to have a comment display area in which is displayed at least part of a comment group including comments from viewers, and such that the display mode is based on at least the number of hidden subsequent comments whose order of posing is later than that of the display portion of the comment group displayed in this area. Therefore, when responding to a comment displayed in the comment display area, the distributor can obtain information based on the number of hidden subsequent comments whose order of posting is later than that of said comment, making it possible, for example, to adjust the speed of response according to the number of hidden subsequent comments. In this way, the video distribution system 1 assists the distributor in responding to comments from viewers.

In this embodiment, the comment group, a part of which is displayed in the comment display area, is made up of only comments inputted by viewers, or in addition to this, can include other comments such as system comments automatically inputted by the system 1.

In this embodiment, the distribution screen may be configured such that the display portion of the comment group displayed in the comment display area is changed according to a specific operation by the distributor. For instance, the comment display area is configured such that displayed comments (those comments that are displayed in the comment display area, from among the plurality of comments constituting a comment group) are changed (switched) according to an operation made to this comment display area itself, an operation to another area/object besides the comment display area, or the like. This configuration allows the distributor to be notified of information based on the number of hidden subsequent comments when a displayed comment is changed according to an operation by the distributor.

Also, the distribution screen may be configured such that a specific object based on at least the number of hidden subsequent comments is displayed. This configuration allows the distributor to be notified of information based on the number of hidden subsequent comments via a specific object.

In this embodiment, the specific object may be displayed according to the number of hidden subsequent comments. That is, the distribution screen may be configured, for example, such that the specific object is not displayed when the number of hidden subsequent comments is less than a specific value (such as zero), but the specific object is displayed when the number of hidden subsequent comments is greater than or equal to a specific value (such as 1 or more). This configuration helps to avoid impeding the visibility of the distribution screen when the number of hidden subsequent comments is small, and this helps the distributor easily recognize how many hidden subsequent comments there are, depending on whether or not a specific object is displayed.

Also, the specific object may be configured to have an appearance that is based on at least the number of hidden subsequent comments. For example, the specific object is configured to have a certain size, color, pattern, or shape based on the number of hidden subsequent comments. Also, the specific object is configured, for example, to display the number of hidden subsequent comments themselves. This configuration allows the distributor to ascertain the number of hidden subsequent comments from the appearance of the specific object.

Also, the distribution screen may be configured to display a number of specific objects based on at least the number of hidden subsequent comments. For example, the distribution screen may be configured to display one specific object when the number of hidden subsequent comments is within a first range, and to display two specific objects when the number of hidden subsequent comments is within a second range that is larger than the first range. This configuration allows the distributor to ascertain the number of hidden subsequent comments from the number of specific objects.

Also, the specific object may be used to control what is displayed in the comment display area. For instance, the distribution screen may be configured such that the display portion of the comment group displayed in the comment display area is charged so that the comment posted last (the most recent comment) in the comment group is displayed according to the selection of a specific object by the distributor. This configuration allows the most recent comment to be displayed by a simple operation on the part of the distributor.

Also, the distribution screen may be configured to control automatic changes (such as automatic scrolling) to the comments displayed in the comment display area according to the number of hidden subsequent comments. For example, the distribution screen may be configured such that the display portion of the comment group displayed in the comment display area is changed so that newly posted comments are displayed when the number of hidden subsequent comments is less than a specific value (such as zero) according to the addition of newly posted comments to the comment group, but the display portion of this comment group is not changed when the number of hidden subsequent comments is equal to or greater than a specific value (such as 1 or more). This configuration allows the distributor to easily maintain a state in which the most recently posted comments are displayed.

Also, the distribution screen may be configured such that the appearance of the comment display area changes based on at least the number of hidden subsequent comments. For example, the comment display area is configured to have a certain shape, size, and color (background color, text color, etc.) based on the number of hidden subsequent comments. Also, for example, the comment display area is configured to display the number of hidden subsequent comments themselves. This configuration allows the distributor to ascertain the number of hidden subsequent comments from the appearance of the comment display area. Furthermore, the distribution screen may be configured such that the appearance of the area/objects besides the comment display area changes based on at least the number of hidden subsequent comments.

Also, the distribution screen may be configured such that the display mode is based on at least the duration of a state in which the number of hidden subsequent comments is within a specific range. For example, the distribution screen is configured to be in a first display mode when the duration of a state in which the number of hidden subsequent comments is within the specific range is equal to or longer than a first length of time, and to be in a second display mode when said duration is equal to or longer than a second length of time that is longer than the first length of time. Also, for example, the distribution screen is configured to be in a first display mode when the duration of a state in which the number of hidden subsequent comments is within a first range is equal to or longer than a first length of time, and to be in a second display mode when said duration is equal to or longer than a second length of time that is longer than the first length of time. This configuration allows the distributor to obtain information based on the duration of a state in which the number of hidden subsequent comments is within a specific range.

In this embodiment, the viewing screen may also be configured to have the same configuration as the distribution screen in the various modes described above. For instance, the viewing screen may be configured to have the same comment display area as that of the distribution screen, and such that the display mode is based on at least the number of hidden subsequent comments. This configuration allows a viewer to obtain information based on the number of hidden subsequent comments whose order of posting is later than that of said comment when the viewer confirms a comment displayed in the comment display area.

Next, a specific example of the video distribution system 1 of this embodiment having such a function will be described. FIG. 3 shows an example of information that is managed in the user information table 411 in this example. The user information table 411 manages information about users of the live video distribution service and, as shown in the table, manages, in association with a "user account" that identifies an individual user, "basic information," which includes the account name, age, sex, and so forth, "distribution history information," which is information about the distribution history of live video, "viewing history information," which is information about the viewing history of live video distributed by other users, "followed user information," which is information about other users followed by this user, "follower information," which is information about other users (followers) who follow this user, "family information," which is information about the family which this user has joined as a family member, "ranking," which indicates the ranking of the user as a distributor, "ranking meter value," which is a parameter value for determining whether the ranking has promoted or demoted, "number of coins possessed," which indicates the number of virtual coins possessed in the live video distribution service, "number of diamonds possessed," which indicates the number of virtual diamonds possessed in this service, and other such information.

A family is a community (group) for supporting a particular distributor, and a user can join (become a family member) through the approval of the administrator of the family or the like. Family information includes information that can identify each of one or more families which this user has joined.

FIG. 4 is a table illustrating the "ranking" of a distributor in this example. As shown in the table, in this example, there are six ranking groups of "S," "A," "B," "C," "D," and "E," and each of the five ranking groups of "S," "A," "B," "C," and "D" is configured so that there is a ranking with a "+" added to the letter, a ranking that is the letter alone, and a ranking with a "−" added to the letter to give three rankings, such as "S+," "S," and "S−." The ranking group of "E" consists of just one ranking, "E." That is, in this example, there are 16 levels of ranking (3×5+1=16).

Also, the "S" side is the highest ranking group and the "E" side is the lowest. Also, in the rankings within a given ranking group, the "+" side is the highest ranking and the "−" side is the lowest ranking. In this example, the initial value of the user ranking is set to "D−."

FIG. 5 shows an example of the information that is managed in the distribution management table 412 in this example. The distribution management table 412 manages information about the distribution of individual live videos and, as shown in the table, manages, in association with a "distribution ID" for identifying an individual distribution (a live video), "distributor user account," which identifies the distributor of this distribution, "distribution date and time," "distribution duration," which indicates the duration of distribution, "number of viewers (current value and maximum value)," "number of comments," which is the number of comments inputted by viewers, "number of likes," which is the number of "likes" inputted by viewers, "item points," which increase according to the input of items by viewers, "distribution points," which are points awarded to this distribution, and other such information.

Figure 6:
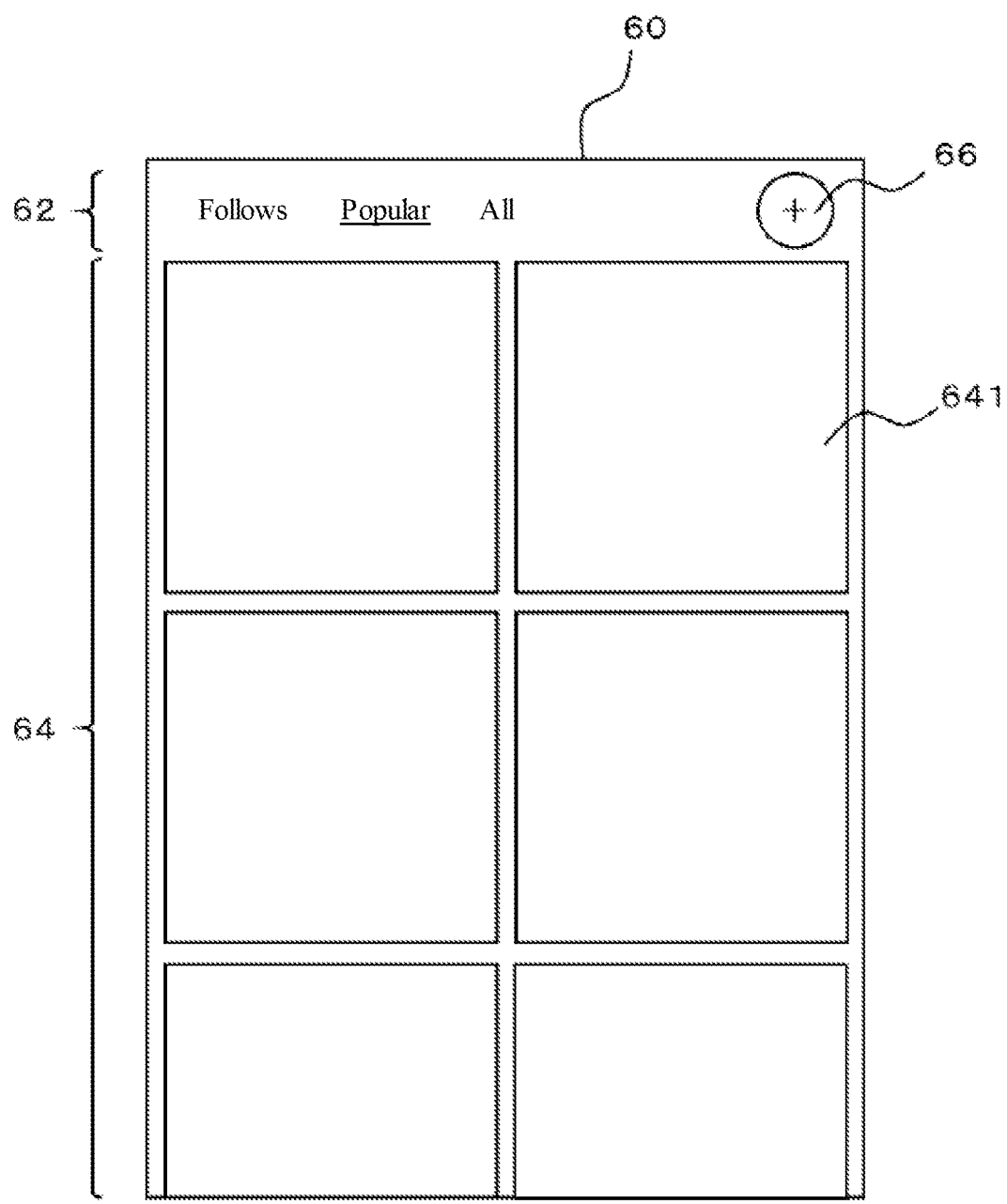
FIG. 6 An example of a top screen 60.

FIG. 6 shows an example of the top screen 60 of the live video distribution service displayed on the user terminal 30. This screen 60 serves as the starting point for a user of the live video distribution service and, as shown in the drawing, this screen has a selection area 62 displaying "follows," "popular," and "all," a list display area 64 that is located in the lower side of the selection area 62 and displays a list of live videos being distributed, and a circular distribution start button 66 located in the upper-right corner of the screen.

The selection area 62 is an area for selecting what is to be displayed in the list display area 64. More specifically, when "follows" is selected in the selection area 62, a list of live videos being distributed by other users followed by the user is displayed in the list display area 64. Similarly, when "popular" is selected in the selection area 62, a list of live videos for which live videos that have been extracted according to a specific extraction condition for extracting popular videos (for example, the number of viewers (current value) is equal or larger than a certain threshold value, etc.) is displayed in the list display area 64. When "all" is selected in the selection area 62, a list of all live videos being distributed is displayed in the list display area 64.

In the list display area 64, as shown in FIG. 6, a plurality of individual display areas 641 each displaying information about an individual live video are disposed in two columns. The individual display areas 641 display a still image that has been preset by the distributor of the live video, the account name of the distributor, the number of viewers (current value), and the like, and are configured so that viewing of the corresponding live video is commenced according to the selection by the user. The list display area 64 is configured such that the individual display areas 641 that are displayed are switched by an upward or downward flick operation or slide operation.

The distribution start button 66 is an object for the user to start distribution of a live video as a distributor. When the distribution start button 66 is selected by the user, the distribution of a live video begins, and more specifically, the transmission of the video, composed of the image inputted via the camera of the user terminal 30 and the audio inputted via the microphone of this user terminal 30, to the server 10 is started. Also, a new record is created in the distribution management table 412 in response to the start of distribution of the live video.

Figure 7:
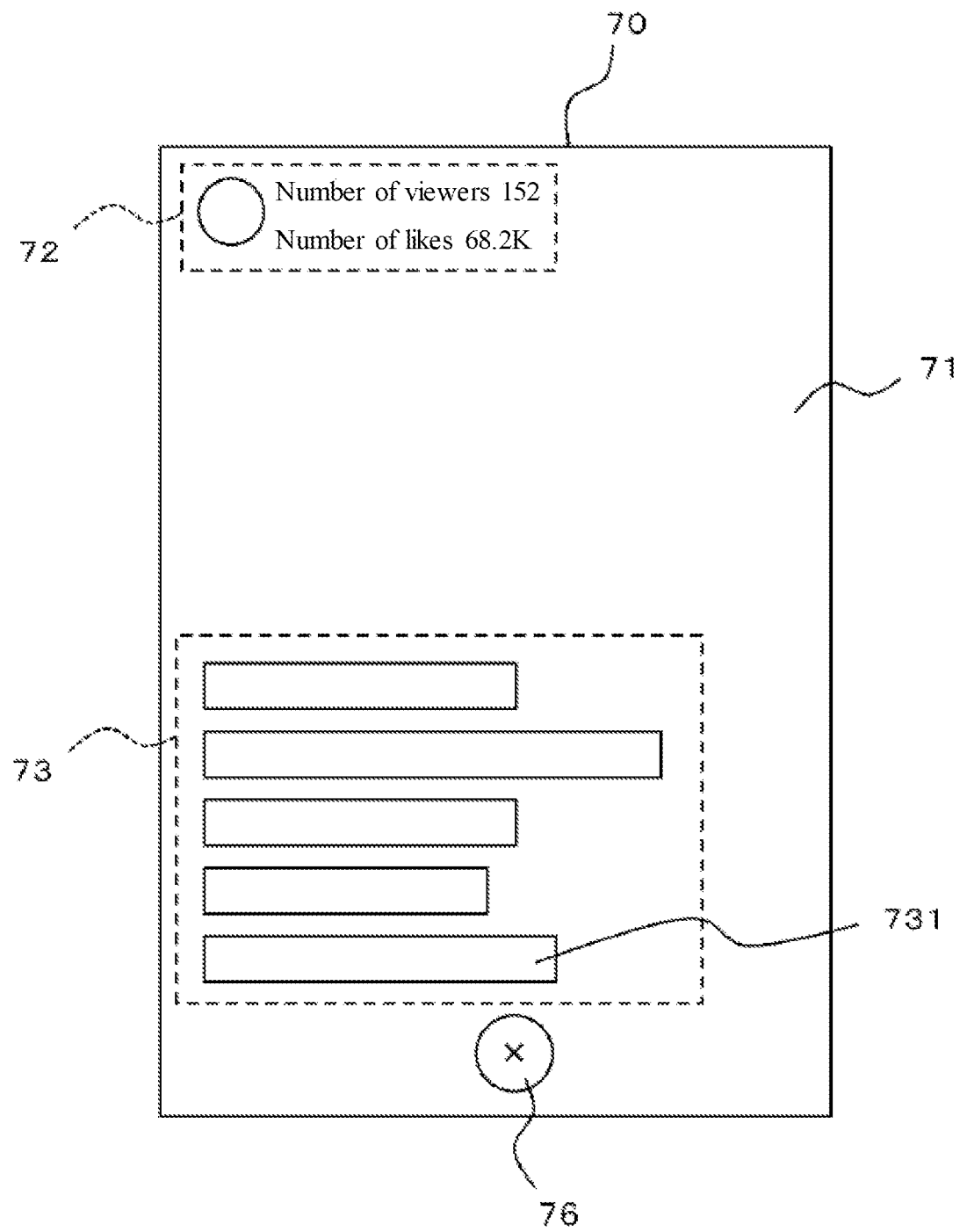
FIG. 7 An example of a distribution screen 70.

FIG. 7 shows an example of a distribution screen 70 displayed on the distributor terminal 30 in response to the selection of the distribution start button 66 (that is, the start of distribution of a live video). As shown in the drawing, this screen 70 has a video display area 71 corresponding to the entire screen, a basic information display area 72 located in the upper-left corner of the screen, a comment display area 73 located in the lower-left corner of the screen, and a circular distribution stop button 76 located in the center at the lower end of the screen.

In the video display area 71 is displayed the live video to be distributed, that is, the image inputted via the camera of the distributor terminal 30. Since the distributor usually captures an image of himself or herself via the front camera of the distributor terminal 30, the distributed live video includes the distributor's own image.

The basic information display area 72 displays the basic information about this distribution and, more specifically, displays distributor information (profile image, etc.), the number of viewers (current value) of this distribution, the number of "likes" inputted by viewers for this distribution, and so forth.

The comment display area 73 is an area for displaying user comments inputted by viewers or system comments inputted automatically. More specifically, a plurality of comment objects 731 each corresponding to an individual comment are arranged vertically in this area 73. The comment display area 73 is configured as a transparent area, and the comment object 731 is configured as a semi-transparent object.

The distribution stop button 76 is an object with which the distributor stops the distribution of live video. When this distribution stop button 76 is selected by the distributor, the distribution of the live video (the transmission of the live video from the distributor terminal 30 to the server 10) is stopped.

Figure 8:
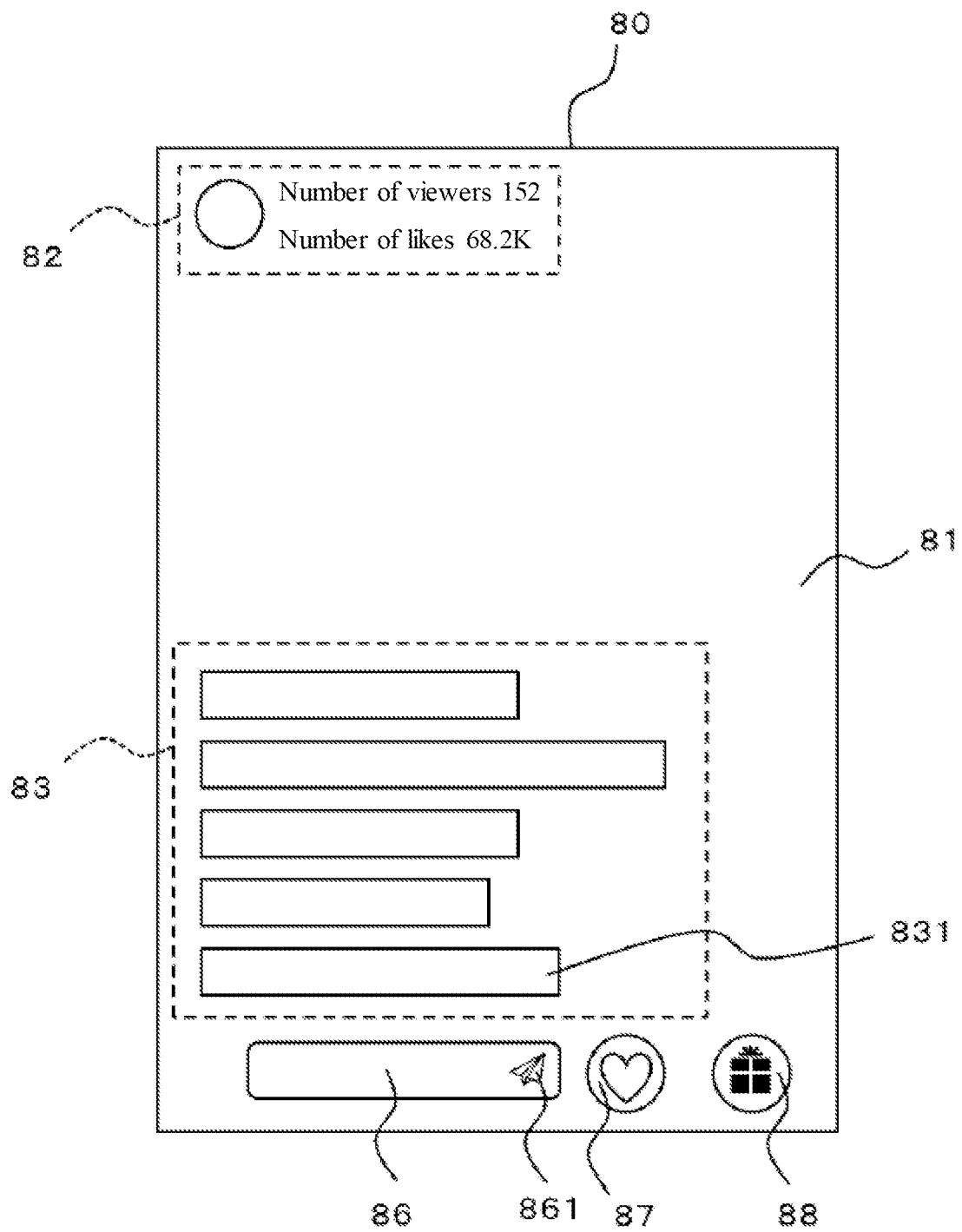
FIG. 8 An example of a viewing screen 80.

FIG. 8 shows an example of a viewing screen 80 displayed on the viewer terminal 30. For example, when a viewer selects any live video via the list display area 64 on the top screen 60, a viewing screen 80 for viewing the selected live video is displayed on the viewer terminal 30. As shown in the figure, this screen 80 is similar to the distribution screen 70 described above in that it has a video display area 81, a basic information display area 82, and a comment display area 83. The viewing screen 80 also has a comment input area 86, a "like" button 87 with a heart icon, and an item input button 88 with a gift icon, which are displayed at the lower end of the screen.

The comment input area 86 is an area for the viewer to input comments. A transmission object 861 is disposed at the right end of this area 86, and when this object 861 is selected, the character string inputted in the comment input area 86 is inputted as a user comment, and the comment input data is transmitted from the viewer terminal 30 to the server 10. The comment input data includes the content of the comment and the user account of the viewer who inputted the comment. The server 10 that has received the comment input data transmits this comment input data to the corresponding distributor terminal 30 (the distributor terminal 30 of the distributor of the corresponding live video) and the various viewer terminals 30 (the viewer terminals 30 of the plurality of viewers of the corresponding live video). Also, the server 10 that has received the comment input data updates (adds 1 to) the number of comments in the distribution management table 412.

At the distributor terminal 30 and the viewer terminals 30 that have received the comment input data from the server 10, the comment objects 731 and 831 corresponding to user comments can be displayed in the comment display areas 73 and 83 of the distribution screen 70 and the viewing screen 80. The content (character string) of a comment is displayed along with the account name of the viewer who has inputted this comment in the comment objects 731 and 831 corresponding to the user comment.

The like button 87 is an object with which the viewer inputs a "like" to a distributor. When the viewer selects this button 87, a "like" is inputted, and like input data is transmitted from the viewer terminal 30 to the server 10. The like input data includes the user account of the viewer who has inputted the "like." The server 10 that has received the like input data transmits this like input data to the corresponding distributor terminal 30 and the viewer terminals 30. Also, the server 10 that has received the like input data updates (adds 1 to) the "number of likes" in the distribution management table 412.

At the distributor terminal 30 and the viewer terminals 30 that have received like input data from the server 10, comment objects 731 and 831 corresponding to a system comment notifying of the input of a "like" can be displayed in the comment display areas 73 and 83 of the distribution screen 70 and the viewing screen 80. Text indicating the input of a "like" is displayed along with the account name of the viewer who has inputted the "like" in the comment objects 731 and 831 corresponding to this system comment. At the distributor terminal 30 and the viewer terminals 30 that have received the like input data, a specific visual effect (such as an animation effect in which a heart-shaped object is displayed so as to flow from the lower side of the screen toward the upper side, etc.) is added in the video display areas 71 and 81 of the distribution screen 70 and the viewing screen 80.

Figure 9:
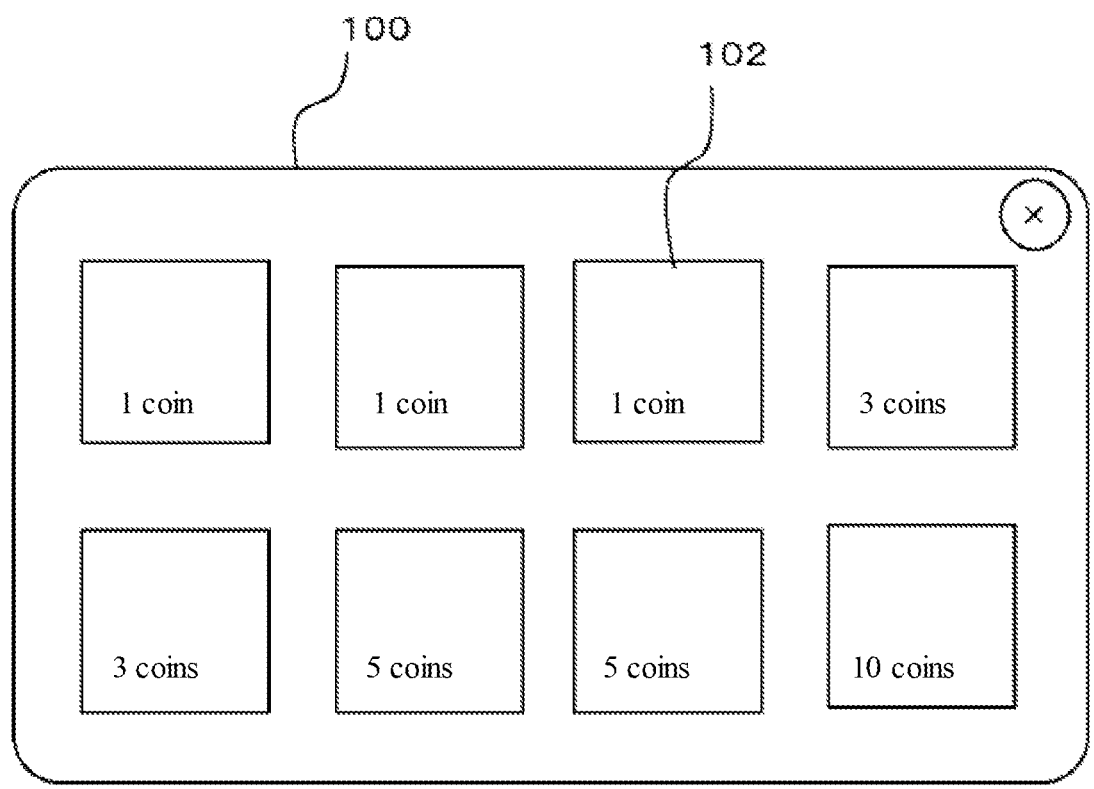
FIG. 9 An example of an item selection screen 100.

The item input button 88 is an object with which the viewer inputs an item. When the viewer selects this button 88, the item selection screen 100 depicted in FIG. 9 is displayed superposed over the viewing screen 80. As shown in the drawing, this screen 100 displays a list of a plurality of individual display areas 102, each of which displays information about an item. The individual display areas 102 display images corresponding to items, as well as the number of coins required to input those items.

In this example, a plurality of items that can be inputted by the viewer have been preset, and the number of coins has been preset as the price (value, consideration) thereof. The item selection screen 100 displays a list of a plurality of items that can be inputted. When the viewer selects an item via the item selection screen 100, the selected item is inputted.

When an item is inputted, item input data is transmitted from the viewer terminal 30 to the server 10. This item input data includes the user account of the viewer who has inputted the item, and information that can specify the inputted item. The server 10 that has received the item input data transmits this item input data to the corresponding distributor terminal 30 and the viewer terminals 30. Also, the server 10 that has received the item input data awards item points corresponding to the number of coins of the inputted item (for example, the greater the number of coins, the more points) to this distribution. More specifically, points corresponding to the number of coins are added to the item points for the corresponding distribution in the distribution management table 412. Also, the server 10 that has received the item input data subtracts the number of coins for the inputted item from the number of coins possessed by the corresponding user (the viewer who has inputted the item) in the user information table 411.

At the distributor terminal 30 and the viewer terminals 30 that have received the item input data from the server 10, comment objects 731 and 831 corresponding to a system comment notifying of the input of an item can be displayed in the comment display areas 73 and 83 of the distribution screen 70 and the viewing screen 80. The name of the inputted item is displayed along with the account name of the viewer who inputted the item in the comment objects 731 and 831 corresponding to this system comment. Also, at the distributor terminal 30 and the viewer terminals 30 that have received the item input data, a visual effect corresponding to the inputted item is added in the video display areas 71 and 81 of the distribution screen 70 and the viewing screen 80.

The comment display area 73 of the distribution screen 70 will now be described in detail. The comment display area 73 in this example is set as a rectangular range in which a plurality of comment objects 731 arranged vertically can be displayed, as indicated by the broken line in FIG. 7.

The comment objects 731 displayed in the comment display area 73 correspond to at least part of a comment group that is composed of a plurality of comments (user comments or system comments). In this comment group, a plurality of comments that have been posted up to the current time since the distributor started the current distribution at the distributor terminal 30 are arranged in their order of posting. Also, the comment objects 731 displayed in the comment display area 73 are arranged so that older comment objects 731 (those posted earlier) are located higher, and newer comment objects 731 (those posted later) are located lower.

Also, the comment display area 73 is configured such that the display portion of the comment group (the portion displayed in this area 73) is slid upward or downward by a flick operation or slide operation. Those comment objects 731 that have been moved to the outside (upper side or lower side) of the comment display area 73 due to a change in the display portion resulting from such an operation will be hidden (temporarily disappear).

Figure 10:
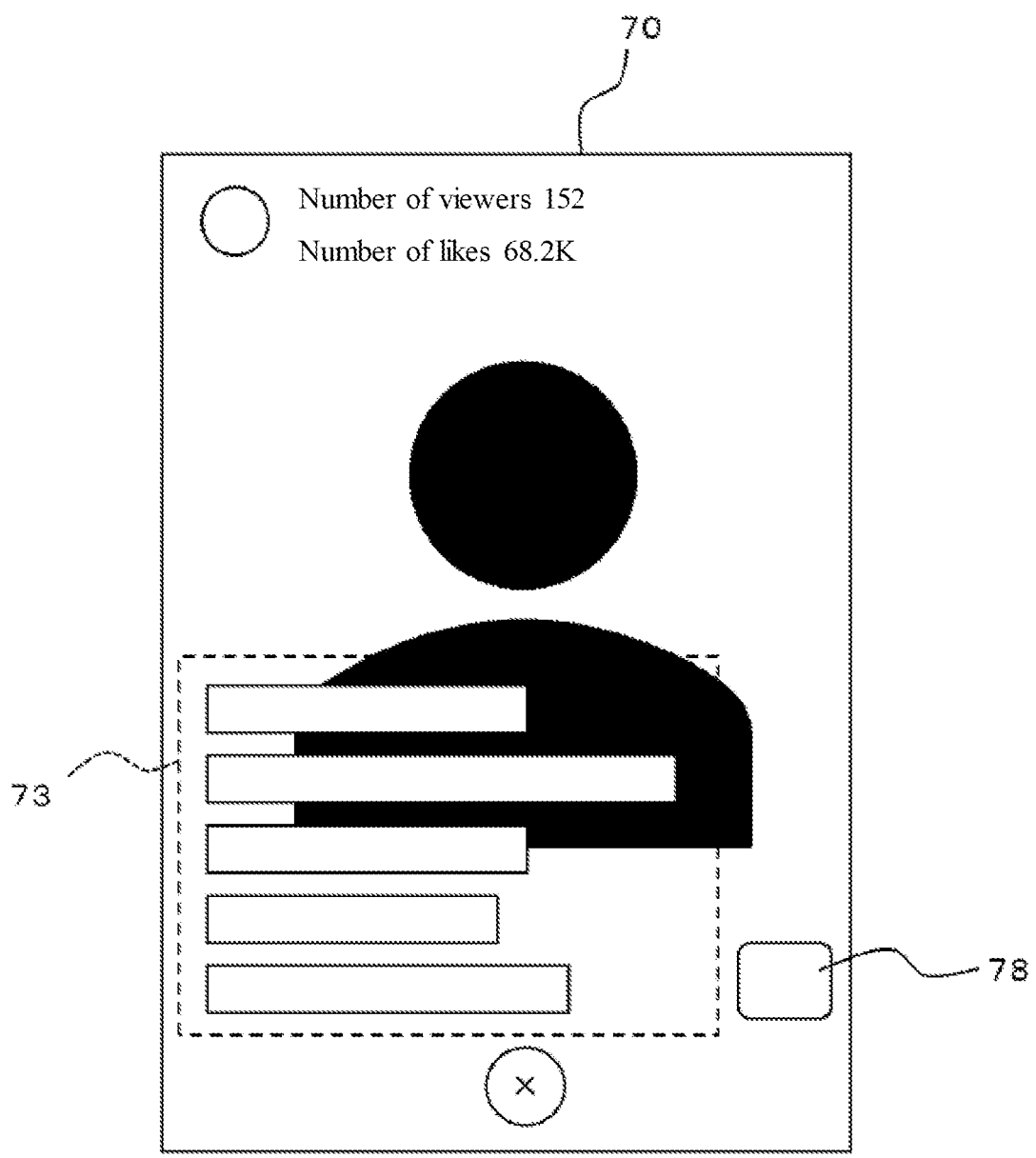
FIG. 10 An example of the distribution screen 70 when the most recent comment object 731 is not displayed in the comment display area 73.

Also, in the distribution screen 70 of this example, if the most recent comment (the comment posted last) in the comment group at the current time is not displayed in the comment display area 73, then the remaining comment count display object 78 is disposed at the lower-right end of the comment display area 73, as shown in the example in FIG. 10.

Figure 11:
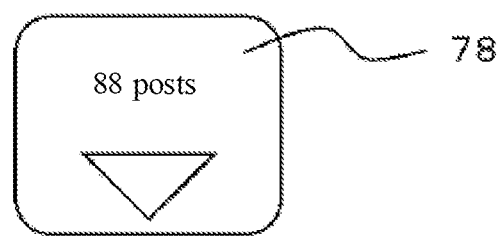
FIG. 11 An example of the appearance of a remaining comment count display object 78.

FIG. 11 shows an example of the appearance of the remaining comment count display object 78. As shown in the drawing, the remaining comment count display object 78 has a rounded rectangular shape, and displays the number of remaining comments ("88 comments" in the example of FIG. 11).

Figure 12:
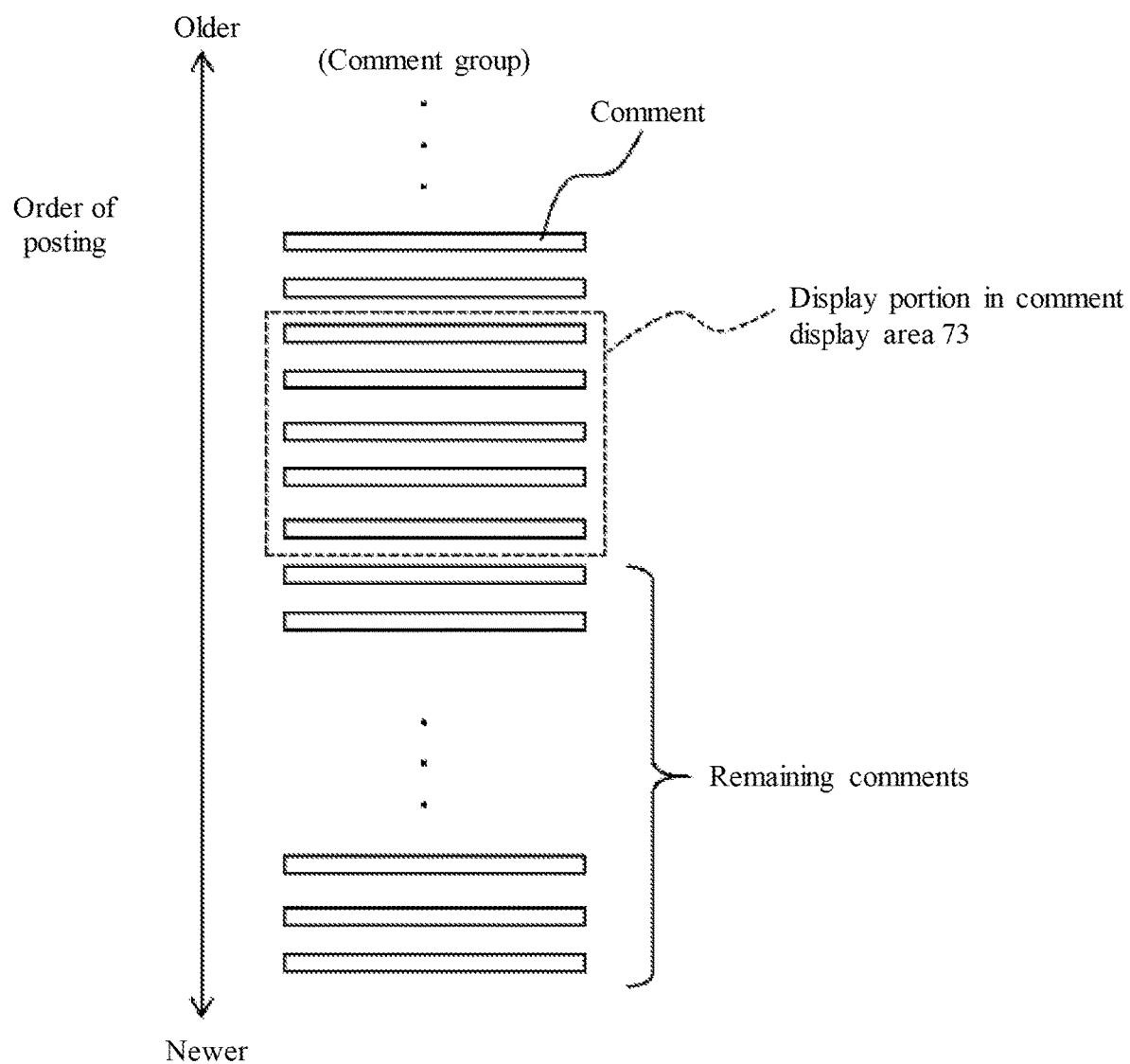
FIG. 12 A diagram illustrating remaining comments.

FIG. 12 is a diagram illustrating the remaining comments in this example. The comment group, a part of which is displayed in the comment display area 73, is configured such that the plurality of comments are arranged in their order of posting, so that older comments are located higher, and newer comments are located lower. As shown in the drawing, of the plurality of comments included in the comment group, (new) comments (hidden subsequent comments), whose order of posting is later than that of the display portion of the comment group displayed in the comment display area 73, are defined as remaining comments. That is, the expression "if the most recent comment in the comment group at the current time is not displayed in the comment display area 73" can be rephrased as "of the plurality of comments included in the comment group at the current time, if the number of remaining comments whose order of posting is later than that of the displayed portion of the comment group displayed in the comment display area 73 is 1 or more."

In this example, as described above, the display portion of the comment group in the comment display area 73 is configured to be slid upward or downward by a flick operation or slide operation and, as a result, when the number of remaining comments changes, the display content in the remaining comment count display object 78 is updated to the number of remaining comments after the change.

Also, in this example, in the middle of an upward or downward flick operation or slide operation to the comment display area 73, the remaining comment count display object 78 is hidden, and after this, if a change in the display portion of the comment group according to this operation is confirmed, then this object 78 is displayed again, and the number of remaining comments after the change is displayed in the object 78. Also, when the most recent comment is displayed in the comment display area 73 due to a change in the display portion of the comment group, the remaining comment count display object 78 is hidden (temporarily disappears).

Also, in this example, when the distributor selects the remaining comment count display object 78, the display portion of the comment group in the comment display area 73 is changed so that the most recent comment at the current time is displayed.

Figure 13:
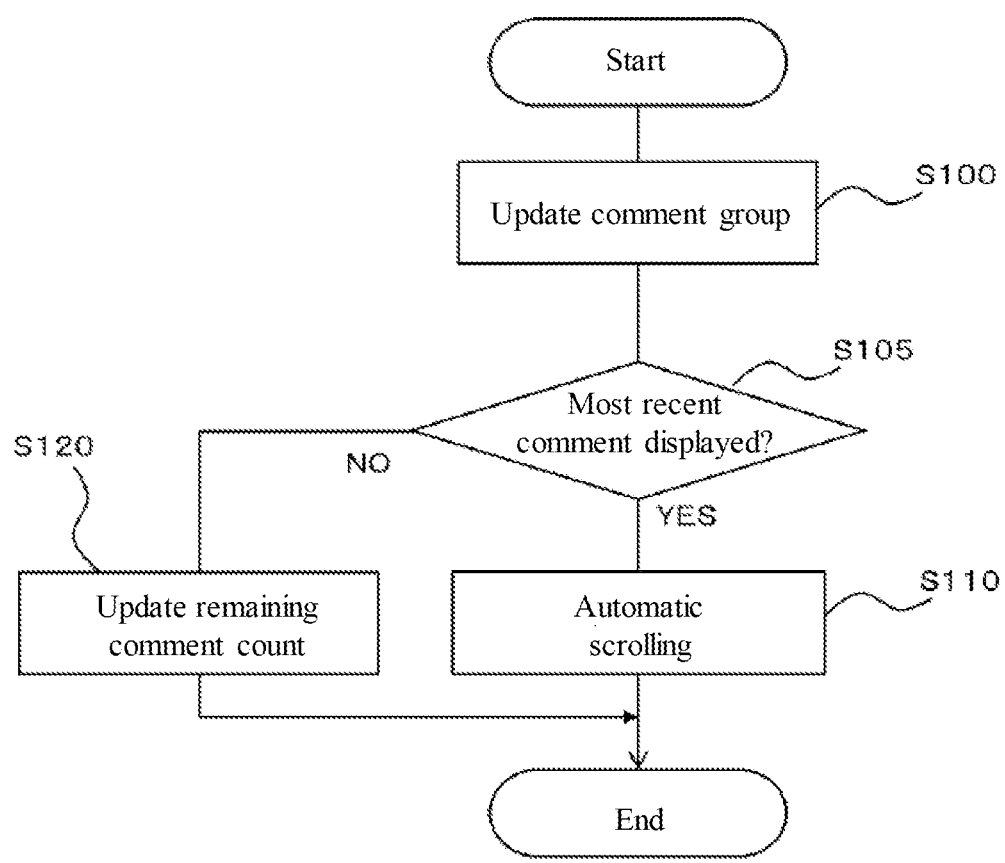
FIG. 13 A flowchart showing an example of the processing executed by the distributor terminal 30 in response to the posting of a new comment.

The control of the display content in the comment display area 73 according to the posting of a new comment will now be described. FIG. 13 is a flowchart showing an example of the processing executed by the distributor terminal 30 in response to the posting of a new comment. More specifically, for example, when the above-mentioned comment input data, like input data, or item input data is received from the server 10, the distributor terminal 30 executes the processing depicted in FIG. 13.

The distributor terminal 30 first updates the comment group (operation S100), as shown in the drawing. More specifically, the current comment is added to the end of the plurality of comments included in the comment group. The comment group in the distributor terminal 30 is managed by the storage device 35 or the like, for example.

Subsequently, the distributor terminal 30 confirms whether or not the comment display area 73 is in the most recent comment display state, in which the most recent comment at the current time (immediately before the addition of the current comment) is displayed (operation S105). In this example, the most recent comment display state can be said to be a state in which the remaining comment count display object 78 is not displayed on the distribution screen 70.

Figure 14:
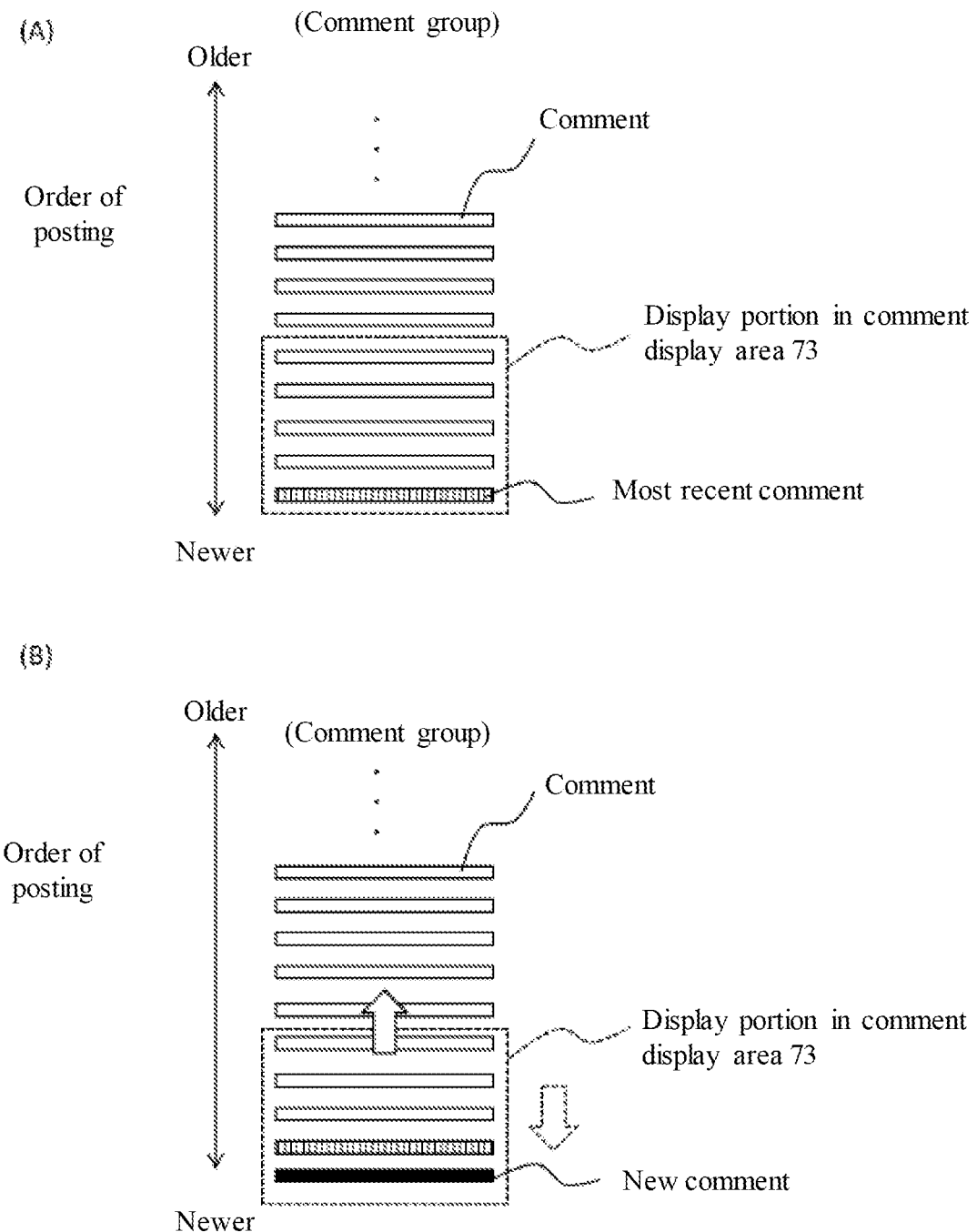
FIG. 14 A diagram illustrating how automatic scrolling is performed in the comment display area 73 in response to the posting of a new comment.

When the comment display area 73 is in the most recent comment display state (Yes in operation S105), the distributor terminal 30 automatically scrolls in this area 73 (operation S110). FIG. 14 is a diagram illustrating how automatic scrolling is performed in the comment display area 73 in response to the posting of a new comment. As shown in the drawing, in a most recent comment display state in which the most recent comment at that point (the corresponding comment object 731) is displayed in the comment display area 73 (included in the display portion of the comment group) (see FIG. 14A), when a new comment is posted, this display portion is slid downward so that the new comment added to the end (bottom) of the comment group will be included in the display portion of the comment group in the comment display area 73 and, as a result, the comment displayed in the area 73 (the comment object 731) is slid upward (FIG. 14B).

Figure 15:
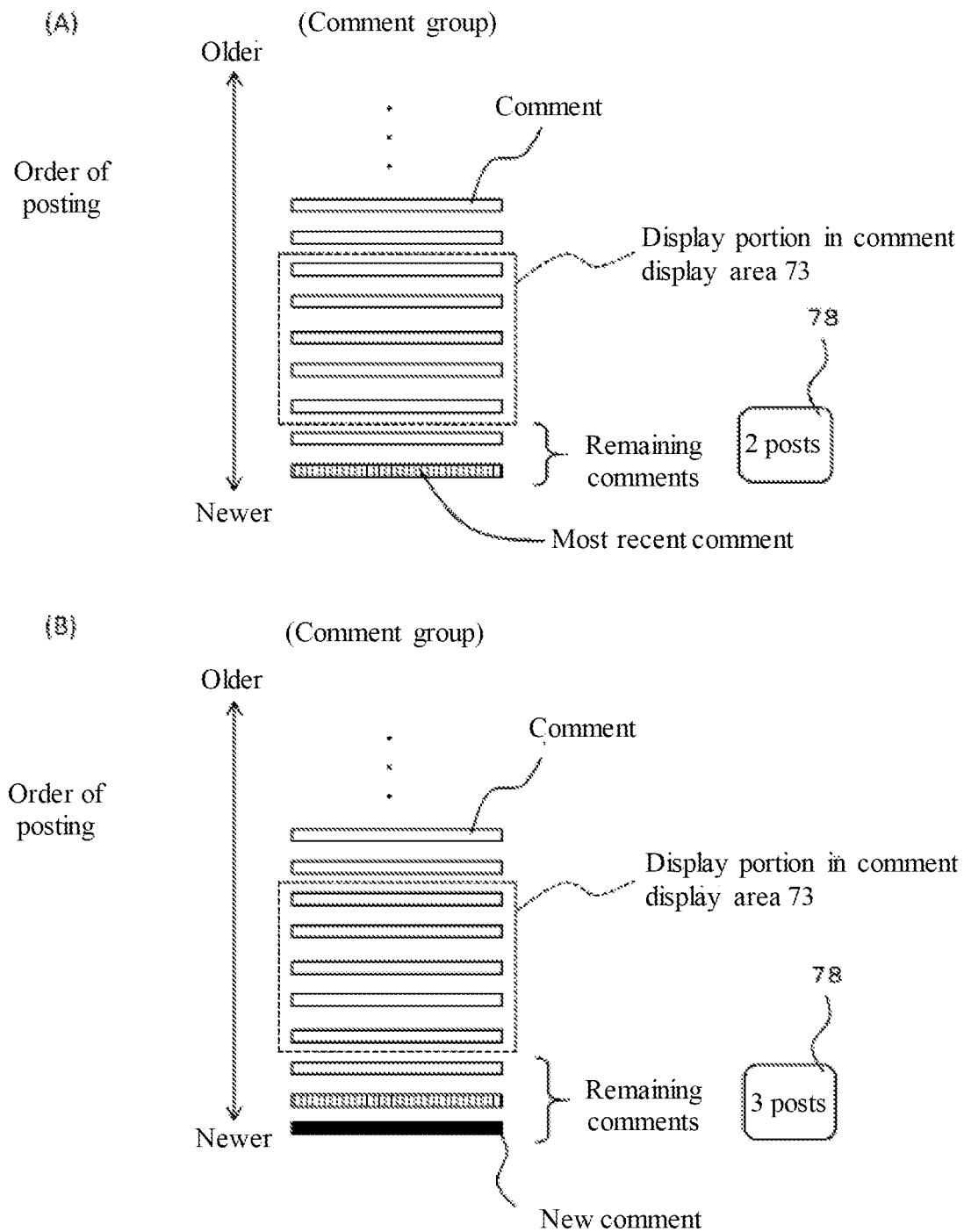
FIG. 15 A diagram illustrating how the display content in the remaining comment count display object 78 is updated according to the posting of a new comment.

Returning to the flowchart in FIG. 13, on the other hand, when the comment display area 73 is not in the most recent comment display state (No in operation S105), the distributor terminal 30 does not perform the above-mentioned automatic scrolling, and the number of remaining comments displayed in the remaining comment count display object 78 is updated (operation S120). FIG. 15 is a diagram illustrating how the display content in the remaining comment count display object 78 is updated according to the posting of a new comment. As shown in the drawing, when a new comment is posted in a state in which the most recent comment at that time (the corresponding object 731) is not displayed in the comment display area 73 (is not included in the display portion of the comment group) (FIG. 15A), the display portion of the comment group in the comment display area 73 is not changed, so the number of remaining comments increases (FIG. 15B). When the number of remaining comments increases, the display of the number of remaining comments in the remaining comment count display object 78 is updated (in the example in FIG. 15, the number of remaining comments is updated from "2 comments" to "3 comments").

Thus, when, for example, the distributor responds to a past comment in a state in which this past comment is displayed in the comment display area 73, the distributor can ascertain the number of remaining comments at that point through the remaining comment count display object 78. In that case, when a new comment is posted, the number of remaining comments displayed in this object 78 is updated, so the distributor can make adjustments. For instance, when the number of remaining comments increases while the distributor is responding sequentially to the past comments while changing the display portion of the comment group in the comment display area 73 by performing an upward flick operation or slide operation in this area 73, for example (in other words, when new comments are being posted faster than the past comments are being responded to), the response speed is increased, but if the number of remaining comments is decreasing (in other words, if new comments are being posted more slowly than the past comments are being responded to), the response speed is maintained or lowered.

Also, in this example, the comment display area 83 of the viewing screen 80 has the same configuration as the comment display area 73 of the distribution screen 70. More specifically, the comment display area 83 of the viewing screen 80 displays a comment object 831 corresponding to at least part of a comment group composed of a plurality of comments (user comments or system comments), and this comment group is configured such that a plurality of comments that have been posted up to the current time since the viewer started viewing the current live video (distribution) on the terminal 30 are arranged in their order of posting. Just as with the distribution screen 70, the viewing screen 80 is configured such that if the most recent comment in the comment group at the current time is not displayed in the comment display area 83, then the remaining comment count display object displaying the number of remaining comments is disposed at the lower-right end of the comment display area 83. In another example of this embodiment, unlike with the distribution screen 70, the remaining comment count display object may not be disposed on the viewing screen 80.

When the distributor selects the distribution stop button 76 on the distribution screen 70, distribution of the live video comes to an end. When the distribution of the live video ends, the server 10 sets distribution points for that distribution. In this example, the distribution points are calculated based on the number of viewers (maximum value), the number of likes, the number of comments, and item points. The distribution points increase in proportion to the number of viewers (maximum value), the number of likes, the number of comments, and the item points. The calculated distribution points are registered in the distribution management table 412.

Figures 16, 17:
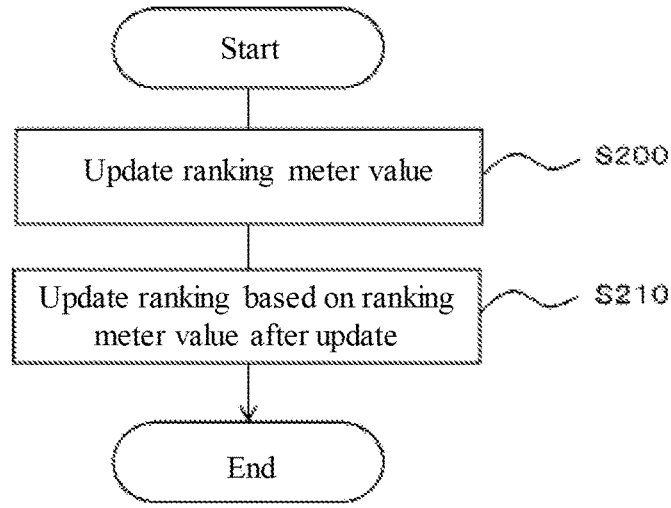
FIG. 16 A flowchart showing an example of processing executed by the server 10 when updating a ranking.
FIG. 17 A diagram illustrating a rule for updating a ranking meter value.

Also, in this example, the ranking for the current day is determined (updated) based on the distribution points that the user acquired the previous day. FIG. 16 is a flowchart showing an example of processing executed by the server 10 when updating the rankings of users. This processing is executed every day in the middle of the night (for example, every day at 3:00 am).

The server 10 first updates the ranking meter value for each user as shown in FIG. 16 (operation S200). FIG. 17 is a diagram illustrating the rule for updating the ranking meter value. As shown in the drawing, in this example, the ranking meter value changes based on the rank of the distribution points acquired by the user on the previous day within the ranking group to which the user belongs. The distribution points acquired by a specific user on the previous day are calculated by referring to the distributor user account, the distribution date and time, and the distribution points listed in the distribution management table 412. When a user makes a plurality of distributions in one day, the distribution points acquired in each of the plurality of distributions are totaled.

More specifically, the rule for updating the ranking meter value is such that, as shown in FIG. 17, first, when the rank of the distribution points falls within the top 10% of the ranking group, the change in the ranking meter value is "+2" (an increase of 2 points). Similarly, when the rank falls within the top 11 to 30% (the remaining 20% obtained by subtracting the top 10% from the top 30%), the change is "+1"; when the rank falls within the middle 30% (the top 31 to 60%), the change is "±0" (no increase or decrease); and when the rank falls within the bottom 40%, the change is "−1" (a decrease of 1 point). In addition, if there was no distribution on the previous day, the change in the ranking meter value is "−1" regardless of where the rank falls within the ranking group.

In operation S200, the ranking meter value of each user is updated according to the update rule illustrated in FIG. 17. If the ranking meter value of a user is negative and the current change in the ranking meter value is an increase (specifically, +2 or +1), the ranking meter value may be increased after being cleared to zero. That is, if the current change for a user whose ranking meter value is "−1" is "+2," for example, the ranking meter value is increased to 2 after being cleared to zero, and the ranking meter value after change becomes "+2" (rather than "+1"). In this way, even if a user has a negative ranking meter value (such as a user with a low distribution frequency), this ranking meter value can be increased sharply, and this encourages the distribution of live video.

Figures 18, 19:
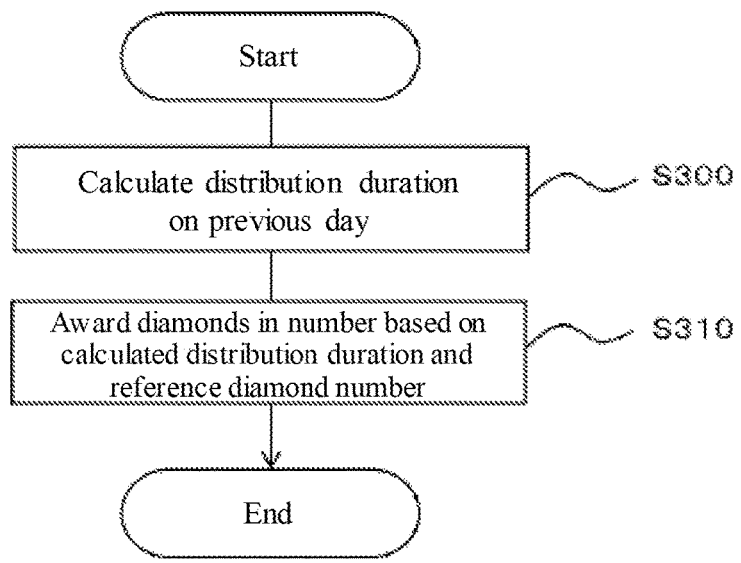
FIG. 18 A diagram illustrating the correlation between ranking update content and a required ranking meter value.
FIG. 19 A flowchart showing an example of the processing executed by the server 10 when diamonds are awarded.

Returning to the flowchart in FIG. 16, when the ranking meter value of each user is updated, the server 10 then updates the rankings based on the updated ranking meter values (operation S210). FIG. 18 is a diagram illustrating the correlation between ranking updates and the required ranking meter value. As shown in the diagram, first, the required ranking meter value for a ranking to move up from one ranking group to another (in other words, when the ranking moves from the highest ranking within a ranking group to the next ranking group) is +4. That is, a user belonging to the highest ranking in a ranking group (such as A+) is promoted to the lowest ranking in the ranking group immediately above (such as S−) when the ranking meter value becomes +4. Also, the required ranking meter value for a ranking to move up within a ranking group (in other words, when the ranking moves up from the middle or the lowest ranking within a ranking group) is +2. That is, a user belonging to the middle ranking or the lowest ranking (such as B or B−) in a ranking group is promoted to the ranking immediately above (such as B+ or B) within the ranking group when the ranking meter value becomes +2.

Similarly, as depicted in FIG. 18, the required ranking meter value for a ranking to be lowered within the ranking group (in other words, when the ranking is lowered from the highest ranking or the middle ranking within a ranking group) is −2. That is, a user belonging to the highest ranking or the middle ranking in a ranking group (such as B+ or B) is demoted to the ranking immediately below within the ranking group (such as B or B−) when the ranking meter value becomes −2. Also, the required ranking meter value for a ranking to be lowered from one ranking group to another is −6. That is, a user belonging to the lowest ranking in a ranking group (such as A−) is demoted to the highest ranking in the ranking group immediately below (such as B+) when the ranking meter value becomes −6. Thus, in this example, the absolute value of the required ranking meter value for promotions and demotions from one ranking group to another is larger than that for promotions and demotions within the same ranking group. As a result, extreme promotions and demotions are less likely to occur within a short period of time.

Returning to the flowchart in FIG. 16, in operation S210 the ranking is updated based on the ranking meter value according to the correlation shown in FIG. 18. The ranking meter value of a user whose ranking has been updated (a user whose ranking has been increased or decreased) is cleared to zero.

Also, in this example, diamonds, which are rewards for users who are distributors, are awarded based on the distribution duration and ranking from the previous day (the ranking on the previous day). FIG. 19 is a flowchart showing an example of the processing executed by the server 10 when diamonds are awarded to the various distributors. This processing is executed every day in the middle of the night. For example, it is executed at a time before the processing that is executed in updating the ranking of the users (such as every day at midnight) as in the example shown in FIG. 16.

The server 10 first calculates the distribution duration on the previous day for each user as shown in the drawing (operation S300). The distribution duration of a particular user on the previous day is specified by referring to, for example, the distributor's user account, the distribution date and time, and the distribution duration in the distribution management table 412. When a user makes a plurality of distributions in one day, the distribution durations of the plurality of distributions are totaled.

Then, the server 10 awards each user a number of diamonds based on the calculated distribution duration and a reference diamond number (operation S310). More specifically, diamonds are awarded to each user in a number obtained by multiplying the calculated distribution duration by the reference diamond number. The reference diamond number is preset for each ranking such that the higher is the ranking, the higher is this number, and the reference diamond number corresponding to the ranking of each user on the previous day is applied. When diamonds are awarded to a user, the number of diamonds possessed in the user information table 411 is updated. In this example, diamonds can be exchanged for coins or real money.

In the above example, when the most recent comment is not displayed in the comment display area 73, the remaining comment count display object 78 that displays the number of remaining comments is present, but this is an example of an object based on the number of remaining comments (hidden subsequent comments), and such an object in this embodiment is not limited to the remaining comment count display object 78 described above.

For example, the remaining comment count display object 78 may be configured to have a certain shape, color, or size according to the number of remaining comments, instead of or in addition to displaying the number of remaining comments itself. For instance, the object 78 may be configured to have a first shape, color, or size while the number of remaining comments is within a first range (such as at least 1 and no more than 19), and to have a second shape, color, or size while the number of remaining comments is within a second range (such as at least 20). Also, this object 78 may be configured such to have a first shape, color, or size if a state in which the number of remaining comments is within the first range is maintained for a first duration (such as 20 seconds), and to have a second shape, color, or size if a state in which the number of remaining comments is within the second range is maintained for a second duration (such as 10 seconds). Furthermore, the remaining comment count display object 78 may be configured to have a first shape, color, or size if a state in which the number of remaining comments is within a specific range is maintained for a first duration (such as 10 seconds), and then to have a second shape, color, or size if this state is subsequently maintained for a second duration (such as 20 seconds).

Figure 20:
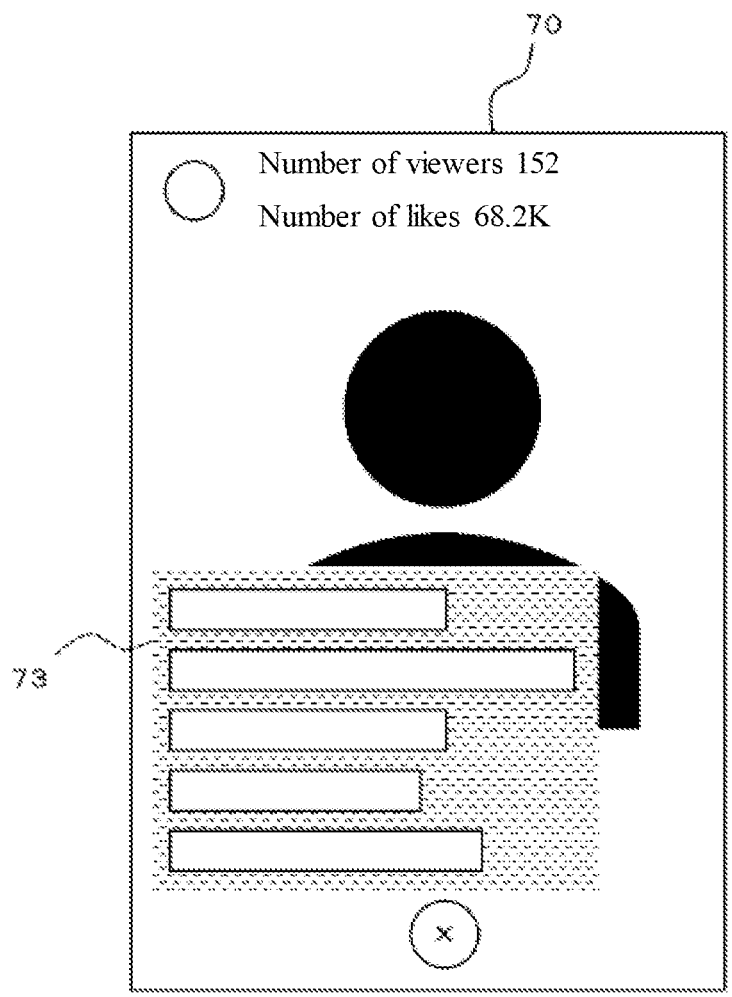
FIG. 20 An example of the distribution screen 70 in another example.

In another example of this embodiment, the distribution screen may be configured such that the appearance of the comment display area 73 changes based on the number of remaining comments, instead of or in addition to the display of the remaining comment count display object 78. For example, as depicted in FIG. 20, the distribution screen 70 in another example may be configured such that the background of the comment display area 73 changes according to the number of remaining comments. For example, the background may have a semitransparent first color while the number of remaining comments is within a first range, and may change to a semitransparent second color while the number of remaining comments is within a second range. Also, the appearance of the video display area 71 may change based on the number of remaining comments.

Also, in another example of this embodiment, the remaining comment count display object 78 may be configured such that the number of system comments is excluded from the remaining comments, and only the number of user comments is displayed.

The video distribution system 1 of this embodiment described above is configured such that the distribution screen presented to the distributor of the live video has a comment display area for displaying at least part of a comment group that includes comments from viewers, and the display mode is based on at least the number of hidden subsequent comments whose order of posting is later than that of the display portion of the comment group displayed in this area (for example, the remaining comment count display object 78 is provided to display the number of remaining comments). Therefore, in responding to comments displayed in the comment display area, the distributor can obtain information based on the number of hidden subsequent comments whose order of posting is later than said comments, making it possible, for example, to adjust the speed of response according to the number of hidden subsequent comments. The video distribution system 1 thus assists the distributor in responding to comments from viewers.

The processing and procedures described in this specification are realized by software, hardware, or any combination thereof, in addition to what was explicitly described. For instance, the processing and procedures described in this specification are realized by installing a logic circuit corresponding to the processing and procedures in an integrated circuit, a volatile memory, a nonvolatile memory, a magnetic disk, or another such medium. Also, the processing and procedures described in this specification can be implemented as a computer program (e.g., non-transitory computer-readable medium including instructions to be performed on a processor) corresponding to said processing and procedures, which can be executed by various kinds of computer.

It was described above that the processing and procedures described in this specification are executed by a single device, software, component, or module, but the processing or procedures may instead be executed by multiple devices, multiple pieces of software, multiple components, and/or multiple modules. Also, the software and hardware elements described in this specification can be realized by combining these into fewer constituent elements, or by breaking them down into more constituent elements.

In this specification, even when the constituent elements of the invention are described as being either singular or plural, or when the description makes no mention of singular or plural, these constituent elements may be either singular or plural, except when specified otherwise.

DESCRIPTION OF THE REFERENCE NUMERALS

1 Video distribution system
10 Video distribution server
11 Computer processor
15 Storage device
20 Communication network
30 User terminal
35 Storage device
41 Information storage management unit
43 Basic function control unit
45 Video distribution control unit
51 Information storage management unit
53 Distribution function control unit
55 Viewing function control unit
60 Top screen
70 Distribution screen
73 Comment display area
731 Comment object
78 Remaining comment count display object
80 Viewing screen
83 Comment display area
831 Comment object
100 Item selection screen

The invention claimed is:

1. A system for distributing live video, comprising one or more computer processors, wherein the one or more computer processors respond to the execution of a readable command to execute:
   processing to present a distribution screen to a distributor of the live video;
   processing to present a viewing screen to each of one or more viewers of the live video; and
   processing to display comments, inputted by at least one of the one or more viewers, on the distribution screen of the distributor and on the viewing screen of each of the one or more viewers, and
   wherein the distribution screen is configured to have a comment display area in which is displayed at least part of a comment group in which a plurality of comments including at least comments inputted by the at least one viewer are arranged in the order of posting, and such that, of the plurality of comments included in the comment group, a display mode is based on at least the number of hidden subsequent comments whose order of posting is later than that of the display portion of the comment group displayed in the comment display area, and
   wherein the distribution screen is configured such that a specific object is not displayed when the number of the hidden subsequent comments is less than a first value, but the specific object is displayed when the number of the hidden subsequent comments is greater than or equal to the first value.

2. The system according to claim 1, wherein the distribution screen is configured such that a display portion of the comment group displayed in the comment display area is changed according to a specific operation by the distributor.

3. The system according to claim 1, wherein the specific object is configured to have an appearance that is based on at least the number of hidden subsequent comments.

4. The system according to claim 3, wherein the specific object is configured to display the number of hidden subsequent comments.

5. A system for distributing live video, comprising one or more computer processors, wherein the one or more computer processors respond to the execution of a readable command to execute:
   processing to present a distribution screen to a distributor of the live video;

processing to present a viewing screen to each of one or more viewers of the live video; and processing to display comments inputted by at least one of the one or more viewers on the distribution screen of the distributor and on the viewing screen of each of the one or more viewers, and wherein the distribution screen is configured to have a comment display area in which is displayed at least part of a comment group in which a plurality of comments including at least comments inputted by the at least one viewer are arranged in the order of posting, and such that, of the plurality of comments included in the comment group, the display mode is based on at least the number of hidden subsequent comments whose order of posting is later than that of the display portion of the comment group displayed in the comment display area, wherein the distribution screen is configured such that a specific object based on at least the number of the hidden subsequent comments is displayed, and wherein the distribution screen is configured such that the display portion of the comment group displayed in the comment display area is changed so that the last comment to be posted in the comment group is displayed according to the selection of the specific object.

6. The system according to claim 1, wherein the distribution screen is configured such that when the number of the hidden subsequent comments is less than a second value according to the addition of a newly posted comment to the comment group, the display portion of the comment group displayed in the comment display area is changed so that the newly posted comment is displayed, but when the number of the hidden subsequent comments is equal to or greater than the second value, the display portion of the comment group displayed in the comment display area is not changed.

7. The system according to claim 1, wherein the distribution screen is configured such that the appearance of the comment display area changes based on at least the number of hidden subsequent comments.

8. The system according to claim 1, wherein the distribution screen is configured such that the display mode is based on at least the duration of a state in which the number of hidden subsequent comments is within a specific range.

9. The system according to claim 1, wherein the viewing screen is also configured to have the comment display area and such that the display mode is based on at least the number of the hidden subsequent comments.

10. A method for distributing live video, which is executed by one or more computers, said method comprising:

presenting a distribution screen to a distributor of the live video;

presenting a viewing screen to each of one or more viewers of the live video; and displaying comments, inputted by at least one of the one or more viewers, on the distribution screen of the distributor and on the viewing screen of each of the one or more viewers, wherein the distribution screen is configured to have a comment display area in which is displayed at least part of a comment group in which a plurality of comments including at least comments inputted by the at least one viewer are arranged in the order of posting, and such that, of the plurality of comments included in the comment group, a display mode is based on at least the number of hidden subsequent comments whose order of posting is later than that of the display portion of the comment group displayed in the comment display area, and wherein the distribution screen is configured such that a specific object is not displayed when the number of the hidden subsequent comments is less than a first value, but the specific object is displayed when the number of the hidden subsequent comments is greater than or equal to the first value.

11. A non-transitory computer-readable medium including instructions to be performed on a processor for distributing live video, which, when executed on one or more computers, causes said one or more computers to execute:

processing to present a distribution screen to a distributor of the live video;

processing to present a viewing screen to each of one or more viewers of the live video; and processing to display comments, inputted by at least one of the one or more viewers, on the distribution screen of the distributor and on the viewing screen of each of the one or more viewers, and wherein the distribution screen is configured to have a comment display area in which is displayed at least part of a comment group in which a plurality of comments including at least comments inputted by the at least one viewer are arranged in the order of posting, and such that, of the plurality of comments included in the comment group, a display mode is based on at least the number of hidden subsequent comments whose order of posting is later than that of the display portion of the comment group displayed in the comment display area, and wherein the distribution screen is configured such that a specific object is not displayed when the number of the hidden subsequent comments is less than a first value, but the specific object is displayed when the number of the hidden subsequent comments is greater than or equal to the first value.

12. A non-transitory computer-readable medium including instructions to be performed on a processor for distributing live video, which, when executed on a user terminal, causes said user terminal to execute processing to display a distribution screen for distributing the live video, wherein the distribution screen is configured to have a comment display area in which is displayed at least part of a comment group in which a plurality of comments including at least comments inputted by viewers are arranged in the order of posting, and such that, of the plurality of comments included in the comment group, a display mode is based on at least the number of hidden subsequent comments whose order of posting is later than that of the display portion of the comment group displayed in the comment display area, wherein the distribution screen is configured such that a specific object is not displayed when the number of the hidden subsequent comments is less than a first value, but the specific object is displayed when the number of the hidden subsequent comments is greater than or equal to the first value.

* * * * *